United States Patent [19]

Jülke

[11] 4,311,595

[45] Jan. 19, 1982

[54] FLOTATION PROCESS FOR PURIFICATION OF WASTE WATER

[75] Inventor: Elias Jülke, Wettingen, Switzerland

[73] Assignee: BBC, Brown, Boveri & Company, Limited, Baden, Switzerland

[21] Appl. No.: 180,977

[22] Filed: Aug. 25, 1980

[30] Foreign Application Priority Data

Aug. 29, 1979 [CH] Switzerland ............... 7822/79

[51] Int. Cl.³ ........................................ C02F 1/24
[52] U.S. Cl. ............................. 210/671; 210/705
[58] Field of Search ........... 210/704, 705, 707, 693, 210/671

[56] References Cited

U.S. PATENT DOCUMENTS

| | | | |
|---|---|---|---|
| 3,637,490 | 1/1972 | Gardner | 210/705 |
| 3,723,307 | 3/1973 | Hunter | 210/671 |
| 3,729,410 | 4/1973 | Abadie et al. | 210/671 |
| 3,975,269 | 8/1976 | Ramirez | 210/707 |
| 4,274,971 | 6/1981 | Hartinger | 210/778 |

FOREIGN PATENT DOCUMENTS

| | | | |
|---|---|---|---|
| 2306178 | 8/1974 | Fed. Rep. of Germany | 210/705 |
| 51-46753 | 4/1976 | Japan | 210/704 |
| 51-78066 | 7/1976 | Japan | 210/705 |
| 451202 | 7/1936 | United Kingdom | 210/704 |

*Primary Examiner*—Thomas G. Wyse
*Attorney, Agent, or Firm*—Oblon, Fisher, Spivak, McClelland & Maier

[57] ABSTRACT

In a flotation method for purification of industrial or municipal waste water, in which the waste water comes in contact with electrodes having an electrical potential capable of electrolytically decomposing a portion of the waste water, thereby creating an ascending stream of gas bubbles, the waste water is mixed before or during the electrolytic decomposition with wettable particles of polymer material which are practically insoluble in water and have an absolute density of 1.3 g/cm³ at the most. Polymeric materials, especially polyalkane fibrids, are suitable for use as particles. This process makes it possible to purify oil-containing waste water by electroflotation without forming an oil film on the electrodes.

7 Claims, No Drawings

FLOTATION PROCESS FOR PURIFICATION OF WASTE WATER

BACKGROUND OF THE INVENTION

1. Field of the Invention

This invention relates to purification of waste water and more particularly to purification of waste water using an electroflotation process.

2. Description of the Prior Art

Various flotation methods are known for purification of waste water, which are distinguished primarily by the manner of producing the ascending stream of gas bubbles in the flotation vessel (flotation cell). Among these are compressed air, vacuum, and excess pressure flotation.

With these methods of purification by flotation the suspended particles contained in the waste water are brought to the surface of the waste water by the stream of gas bubbles and can then be removed. In the process, oily, fibrous, and flocculant materials are captured along with the suspended and floating materials. These former materials would settle out or rise to the surface only very slowly if at all.

In general, flotation, which here means the intentional bringing to the surface of suspended impurities, can be carried out by various mechanisms such as adhesion of the gas bubbles to the suspended phase and/or entrapment or absorption by air bubbles in the floc structure formed in the waste water by the addition of conventional flocculants (water soluble substances of inorganic or organic type which react with components of the waste water to form flocs).

So-called electroflotation produces a particularly fine stream of gas bubbles and has also already been suggested for purification of waste water (see, e.g., Norwegian Pat. No. 92 995). In electroflotation the waste water is brought into contact with electrodes which have an impressed electrical potential, e.g., in the range of 5-60 V. Depending on the current density, which amounts, for example, to 1-2 A/dm$^2$ of electrode surface, the electrolytic decomposition of a small part of the waste water causes an ascending stream of very fine electrolytic gas bubbles. Such a fine stream of gas bubbles is particularly advantageous when especially fine impurities are to be removed—perhaps as a secondary purification or for special types of industrial waste water such as drilling oil emulsions—in other words, generally not the comparatively coarse particles formed by the addition to the waste water of additive solution containing flocculants.

Industrial application of electroflotation is not without various difficulties. The main, unsolvable problem associated with using electroflotation for waste water purification and keeping the cost within reason has been the formation of an oil film on the surfaces of the electrodes. When the waste water contains small amounts of emulsified oils, particularly mineral oils, an oil film forms—at least partially due to electrophoretic phenomena—on the surface of the electrode or electrodes and deactivates or "neutralizes" the electrolysis. At the relatively low voltages involved here, even a very thin oil film acts as an electrical insulator. Complete separation of oils from waste water, as a preliminary step in electroflotation perhaps, is generally made more difficult due to the fact that the water contains emulsifying surface-active agents which have gotten into the water either accidentally—perhaps as cleaning agent residues—or "intentionally" e.g., as elements of stabilized emulsions.

SUMMARY OF THE INVENTION

The object of the invention is to produce an improved method of waste water purification by electroflotation which particularly avoids oil separation on the electrode surfaces even when the waste water is of industrial origin and consists entirely or partially of used industrial oil emulsions such as are used in great amounts in metal cutting.

The object of the invention is attained by mixing the water coming in contact with the electrodes, either before or during electrolytic decomposition, with wettable particles, preferably in the form of fibrids known in the production of synthetic papers, consisting of a polymeric material which is practically insoluble in water and has an absolute density of 1.3 g/cm$^3$ at the most.

It has been found that even waste water in the form of industrial oil emulsions can be cleaned satisfactorily in this manner. This represents an important advance in the solution of a serious waste water problem, a solution which is economically feasible.

The success of the advance on which the method of this invention is based is surprising; it consists in using a pre-formed finely divided, preferably fibrid-like, solid polymer additive in electroflotation to prevent the formation of an oil film on the electrodes. Quite the opposite would be expected in the known processing of recycled printed paper by compressed air or vacuum flotation to separate the floating printing ink from the non-floating cellulose fibers. In addition, electroflotation would seem, for the reasons set out above, to be unsuitable for processing relatively coarse suspensions or less suitable than the known flotation method for purifying waste water using compressed air or vacuum.

DETAILED DESCRIPTION OF THE INVENTION AND PREFERRED EMBODIMENTS

As mentioned above, the electroflotation method according to the invention uses preferably wettable particles in the form of synthetic polymer fibrids which are described in greater detail below.

Wettable polymer particles of other forms, e.g., polymer powder (for example, up to 500 $\mu$m particle size), foam rubber particles (for example, up to 50 $\mu$m particle size) and fibers (for example, fiber thickness up to 50 $\mu$m and fiber lengths up to about 2 mm) are suitable for use in the place of or in addition to the fibrids, if the polymer material of the particles satisfies the conditions mentioned above.

The fibrids or particles are considered wettable so they can be dispersed in the treated water, e.g., with a mechanical mixer. Since different types of waste water can have different wetting properties for a given material, this can be ascertained in uncertain cases by a few simple trials.

According to a preferred embodiment of the method of the invention, the polymer particles or fibrids are wetted with water before being introduced into the electroflotation chamber, e.g., made into a dough and-/or dispersed in water to form a more or less fluid mass, that means a more concentrated master-batch.

The preferably premoistened (with water) polymer particles or fibers can be mixed with the waste water to be processed either continuously or in batches, and the operation of the flotation cell can be adjusted. This allows the preferred, relatively uniform dispersion of the polymer particles or fibrids in the waste water to be achieved either before or while the water is being fed into the flotation chamber, or in the flotation chamber itself.

The respective form of the electrode surfaces is to be considered in optimizing the process, in as much as the water reaching the charged electrodes is already interacting with the polymer particles or fibrids.

The mechanism by which the surprisingly effective prevention of oil film formation on electrodes is achieved with the method taught in the invention has not yet been explained. At any rate, the polymer particles or fibrids dispersed in the waste water interact with the suspended or emulsified solid or liquid impurities with a kind of occlusive effect, hereinbelow designated as "binding power". When the polymer particles float to the surface either due to their density and/or due to the stream of gas bubbles, they can be removed ("skimmed") along with the impurities from the surface of the water. The rising mass can have a relatively solid consistency, like a paste.

The preferred polymer fibrids form a mush ranging from thick to very thick. This takes place even in mixtures (based on the dry weight of the fibers) of a few percent or fractions of a percent (in the range of from 0.5 to 5% by weight). Such a mush has enough binding power to bind many times, e.g., ten times, its weight of the oil contained in the waste water and is, therefore, suited for electroflotation of undiluted industrial mineral oil emulsions of the type commonly used in metal working, for example. With municipal waste water the maximum amount of mineral oil is several orders of magnitude less than the oil content of industrial emulsions, thus considerably smaller concentrations of polymer fibrids can be used, e.g., somewhere in the range of from 0.01 to 1% by weight (dry fibrid weight). The minimum value just given is not to be taken as generally critical.

It is assumed that the absolute concentration of polymer particles is comparatively less important than the extent to which the respective polymer particles in dispersion are able to form a more or less loose network in the aqueous phase. The viscosity of an aqueous dispersion achievable with given polymer particles and a given concentration can serve as an approximation of the ability of the particles to form such networks, but it cannot be determined with the usual viscometers, i.e., with those unsuited for macrodisperse systems. Even the values determined by common rotation viscometers with smooth spindles are probably not significant.

As a rule, polymer particles in the form of fibrids are used to process industrial waste water, i.e., containing mineral oil, (undiluted or diluted oil emulsions). The fibrid concentration (based on dry weight) is typically at least around 5–20% of the oil concentration. It becomes evident from the information above dealing with an advantageous concentration of polymer particles or fibrids in waste water, that an amount of polymer particles is normally used having a binding power in excess of that actually needed. It is, therefore, possible to recirculate or reintroduce into the process the polymer particles or fibrids which rise to the surface after skimming. If the floating material contains detectable amounts of oil, the particles can be reused after first being cleaned, e.g., with a solvent. It may also be more economical and practical to use the oil-containing polymer particles as fuel.

For the above-mentioned reasons of binding or network forming ability, fibrids are preferred, i.e., the known fibrillated fibrous polymers, such as are available industrially for the production of synthetic papers, non-woven textile materials, insulation padding and the like, and which are described, for example, in U.S. Pat. No. 2,998,782, British Pat. No. 836,328, and the Journal article *Angewandte Chemie*, 90 (1978), pp. 833–839, as well as the brochures of companies supplying industrial polymer fiber products designated as synthetic pulps.

The following trademarks represent some suitable industrial products: PULPEX (Solvay), HOSTAPULP (Hoechst Dye Works) CARIFIL (Shell), FERLOSA (Montedison).

LEXTAR (Hercules), and Mitsui-Zellerbach/Japan. The polymer fibers most often used today are produced by various methods, but are made of polyalkanes as a rule, particularly of polyethylene and polypropylene.

Since fibrids are also available made of other homopolymer or copolymer, fiber-forming synthetic polymers, fibrids based on other polyalkanes, or derived from polyolefines, polyamides, polyesters, polyacetals and the like can be considered for the method of the invention, and indeed, as homopolymers, copolymers, or mixtures.

Small non-fibrous polymer particles based on the above-mentioned thermoplastics, on elastomers, or on duroplastics can also be used. Typical examples include polyurethanes, formaldehyde condensates with urea, phenol, melamine or casein, as well as vinyl polymers.

The absolute density of the polymer in the particles or fibrids is at the most 1.3 g/cm$^3$ and usually lies in the range of 0.8 to 1.2 g/cm$^3$. The absolute densities of polymers can be obtained from the technical literature. Possible fillers or pigment components in the polymer mass which forms the particles can be considered in determining the absolute density. In contrast, the relative density (powder or settled apparent density) of the particles is nearly insignificant as long as the void volume, which determines the difference between the absolute density of the polymer material and the relative density of the particles, is practically filled when the material is submerged in the waste water.

All of the polymers mentioned above has absolute densities in the range of 0.8 to 1.3 g/cm$^3$ and can contain fillers in any amount as long as the absolute density does not exceed the limit of 1.3 or preferrably 1.2 g/cm$^3$. This upper limit has proved significant in relation to the ability to float to the surface.

The polymer material in the fibers or particles is practically water-insoluble (solubility in water at 20° C. less than 1 g/liter) and preferably experiences practically no swelling in water (water absorption at 20° C. less than 10% of weight). These conditions are normally fulfilled by the polymers mentioned above.

On the other hand, many of the polymer materials mentioned as examples are very nearly or completely not wettable, e.g., the polyalkanes. Wettability, adequate for the purpose of the invention, of a polymer material which is not adequately wettable with water, i.e., stated concretely, the ability of the particles to form aqueous dispersions, can be achieved by hydrophilic methods customary in textile finishing. The prefered industrial polymer fibrids based on polyalkanes are normally hydrophilized.

Special information dealing with hydrophilization of polyalkane fibers can be found in the literature article mentioned above: *Angewandte Chemie* 90 (1978), pp. 833–839. Examplary suitable methods for achieving a proper wettability of the particles are those which utilize surface treatments with hydrophilic coating substances such as urea-formaldehyde resins, polyvinyl alcohol, polyethylenimine, polyvinyl pyrrolidone (PVP), polyacrylamide, sodium acrylate and surfactants, as well as chemical modification of the polymer surface.

Known electroflotation installations generally used for waste water purification can be used to carry out the method according to the invention. Modifications which may be needed to feed in and separate out the polymer particles or fibers according to the invention are within the experience of any person of average skill in the art.

The operation of electroflotation installations for purification of waste water, including the customary voltage, current, and current density values, as well as their control are within the knowledge of a person of average skill in the art.

The method according to the invention will be explained in greater detail by means of the following examples.

EXAMPLE 1

Thirty grams of damp industrial polyethylene fibrids (15 g dry material; brand name PE-PULPEX F 041/GP from the Solvay Company) were processed in one liter of water by a turbo mixer (ULTRATURRAX by the Janke and Künkel Company) to form a uniform dispersion. The resulting, relatively thick fluid fibrid dispersion was mixed with an equal volume of an industrial aqueous oil emulsion (oil in water) such as that used for turret lathes, containing about 15% by weight of mineral oil having a density of 0.93 g/cm$^3$ and an emulsifier. The mixture of fibrid dispersion and oil emulsion was fed into a batch of electroflotation cell. The electrode surface area was about 1 dm$^2$ with an anode/cathode ratio of 1:1. The voltage was 12 V, and the current was 1.5 A per dm$^2$ of electrode surface. After 10 minutes of electroflotation the fiber slurry had risen well and formed a film layer about 8 cm thick which had a firm consistency and could be skimmed off almost completely without much difficulty. The remaining aqueous phase was slightly turbid and cleared up upon mild acidification without any noticeable oil separation.

EXAMPLE 2 (Comparison)

The same procedure was carried out as in Example 1 with the exception that pure water was used in the place of the fibrid dispersion. After a few seconds of electroflotation operation the current fell to practically zero. There was no significant oil separation apparent on the surface of the contents in the electroflotation cell; on the other hand, a coherent oil film was observed to be coating the electrodes when the flotation cell was emptied.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An electroflotation process for removing impurities including oil from oil-containing waste water in contact with electrode surfaces and for inhibiting formation of an oil film on said surfaces, wherein said waste water is electrolyzed, whereby an ascending stream of gas bubbles is produced and said electrolysis takes place in the presence of wettable particles of a polymeric material which is practically insoluble in water and has an absolute density no greater than 1.3 g/dm$^2$, said wettable particles being entrained in said ascending steam of bubbles to rise to the surface of said waste water along with said impurities, removing said particles including oil from the surface of the waste water and reintroducing them into the waste water to be treated after being cleaned of at least a portion of the associated impurities including oil.

2. The process of claim 1, wherein said wettable particles are mixed with said waste water before said electrolysis takes place.

3. The process of claim 1, wherein said wettable particles are mixed with said waste water during said electrolysis.

4. The process of any one of claims 1 through 3, wherein said wettable particles are fibrids made of synthetic organic polymers.

5. The process of any one of claims 1 through 3, wherein said polymeric material has an absolute density of 0.8 to 1.2 g/cm$^3$.

6. The process of claim 4, wherein said synthetic organic polymers are selected from the group consisting of homopolymers and copolymers of olefins, homo- and copolyamides, thermoplastic homo- and copolyesters, and vinyl-polymers.

7. The process of claim 1 or 2 wherein said wettable particles are mixed with water to form a dispersion having a consistency ranging from a paste to a fluid and said dispersion is mixed with said waste water before said waste water is electrolyzed.

* * * * *